Jan. 26, 1960 C. H. WATKINS 2,922,756
METHOD FOR PROCESSING SULFUR-CONTAMINATED STOCK
Filed March 14, 1957
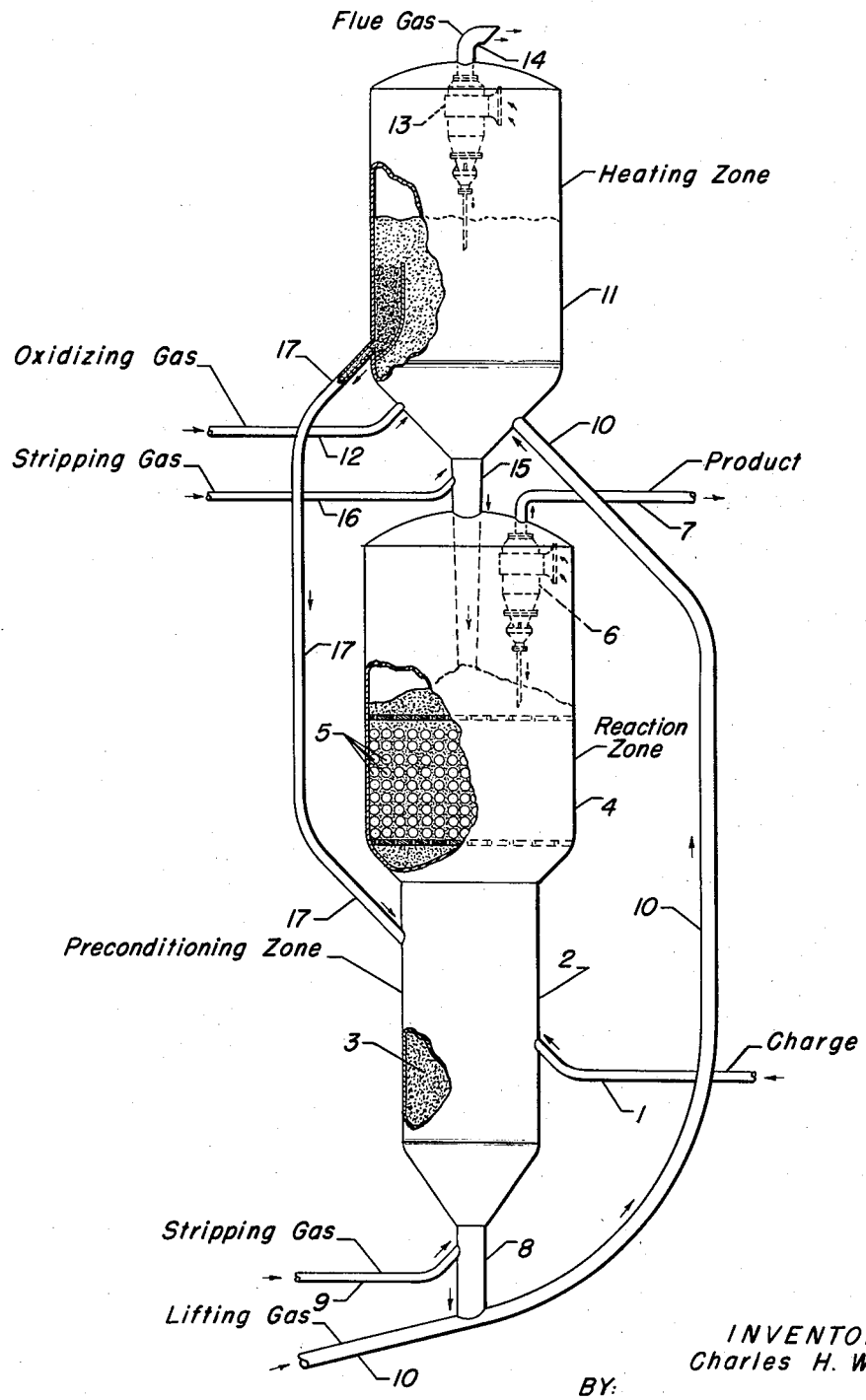
INVENTOR:
Charles H. Watkins
BY:
Chester J. Giuliani
Glen R. Grunewald
ATTORNEYS

United States Patent Office 2,922,756
Patented Jan. 26, 1960

2,922,756

METHOD FOR PROCESSING SULFUR-CONTAMINATED STOCK

Charles H. Watkins, Arlington Heights, Ill., assignor, by mesne assignments, to Universal Oil Products Company, Chicago, Ill., a corporation of Delaware Application March 14, 1957, Serial No. 646,036

7 Claims. (Cl. 208—91)

This invention relates to a method for processing sulfur-contaminated stock and in particular to a special method for catalytically effecting endothermic reactions which employ sulfur-containing stocks as a charge.

Frequently in manufacturing a product from a raw material which is naturally occurring, the presence of impurities which impair the value of the product or the operation of a process present a problem. Typical are processes starting with such materials as petroleum, coal, coke oven products, shale oil, wood tar, etc.

For example, crude petroleum is the starting material for the manufacture of many products including gasoline, lubricating oil, fuel oil, fuel gas, chemical compounds such as specific aromatics or normal paraffins, naphthalene, phthalic or maleic anhydride, hydrated, halogenated, nitrated or sulphonated substitution products of hydrocarbons and many others. Of the impurities occurring in petroleum, the most common, most abundant and perhaps the most harmful is sulfur. Its occurrence is generally in the form of combined sulfur such as mercaptan or thiophene compounds or hydrogen sulfide. Since sulfur occurs combined in many forms, it occurs in all boiling ranges of the petroleum crude so that it is not readily removed by fractionation. The combined sulfur severely reduces the value of the product by causing it to be corrosive, foul smelling and frequently interfering with the desired function of the product, for example, suppressing the octane number of gasoline. Another serious problem is the effect that sulfur has on processing, for example, by poisoning a catalyst or corroding equipment.

The problem of sulfur is so bad that very elaborate means are employed for ridding a stock of sulfur. One means is to treat with strong acids to precipitate the sulfur bearing molecules into a sludge and separate the sludge as a separate phase from the hydrocarbon. This method has the disadvantages of requiring an expensive acid medium in great quantities, of creating a problem of disposing of the corrosive sludge that is formed, and primarily of sacrificing yield since the entire hydrocarbon molecule which contains the sulfur must be sacrificed to remove the sulfur.

A more popular method for treating sulfur-containing stocks is to hydrorefine them by treating with hydrogen at elevated temperature (over 450° F.), high pressure (over 250 p.s.i.) and in the presence of a circulating hydrogen stream. This process forms hydrogen sulfide and a corresponding hydrocarbon from the sulfur bearing molecules and must be followed with a separation process to remove the resultant hydrogen sulfide from the hydrocarbon. The difficulties of this process are that it requires an additional processing step, expensive high pressure-high temperature equipment and an expensive reactant, namely hydrogen. It is an object of this invention to effect a process with a sulfur-contaminated charge stock in a specific manner which eliminates all sulfur removing problems and causes sulfur removal to be an automatic consequence of the combination of process steps.

It is an embodiment of this invention to provide a process for effecting catalyzed reactions with sulfur-contaminated charge which comprises passing said charge into the lower portion of a preconditioning zone wherein said charge is contacted with solid, inert, heat retentive material admixed with a readily reducible, sulfide-forming constituent, passing the desulfurized, preconditioned charge in vapor phase upwardly into an openly communicating reaction zone containing a bed of catalyst particles which are of larger size than said heat retentive particles and through which said heat retentive particles pass in a downwardly direction, removing the resultant product from said reaction zone, passing heat retentive particles from the lower portion of said preconditioning zone into a heating zone and oxidizing said heat retentive particles therein with an oxidizing gas, passing the oxidized and heated heat retentive particles from said heating zone into said reaction zone at a point above said bed of catalyst particles.

The method of this invention provides a process wherein massive heat transfer may be effected directly within the catalyst bed in a reaction zone by direct heat transfer from hot particles which pass therethrough. In addition, this invention provides a combination of a specific type of particle and a preconditioning zone which is openly communicating with said reaction zone to obtain the unexpected benefit of charge stock purification without the necessity of adding a processing step.

This is accomplished by selection of the proper particles in combination with the employment of a preconditioning zone. Preconditioning of a charge may mean many things. Included in preconditioning are such simple processing steps as heating the charge to the proper temperature or vaporizing a liquefied charge, however, in the process of this invention, preconditioning also includes removing sulfur, removing precipitatable or solidifiable carbonaceous material and removing contaminating metallic ions.

Since the hot particles pass to the preconditioning zone in hot condition, they contain sufficient heat to heat, vaporize, and in some cases, effect thermal cracking reactions on the charge. If the hot particles from the reaction zone are not in sufficient quantity and/or temperature to cause the desired effects, provision is made for a stream of hot particles to pass directly from the heating zone to the preconditioning zone so that an adjustment of the temperatures within the preconditioning zone may be made. At any rate, in the preconditioning zone, in addition to supplying heat to the charge for purposes of obtaining reaction temperature, vaporization, or thermal cracking, the character of the particles causes the sulfur in the hydrocarbon molecules to react with the particles forming stable sulfides at the conditions in the preconditioning zone. The sulfur in the charge passes from the charge stock to the heating zone in the form of sulfides and, during oxidation, the sulfided material is oxidized to produce $SO_2$ which is passed from the heating zone as a gas. The particles, when returned to the reaction zone, are contacted with the purified charge and reduced to a form which may again be sulfided. The sulfur in the charge as a consequence of this sequence of process steps is removed from the hydrocarbon by being combined with the heat retentive particles, oxidized in the heating zone where it produces valuable heat for the process and is separated from the solid particles and discharged as a vapor and, therefore, removed from the process. It may be seen that the sulfur in the charge at no time contacts the catalyst particles and at no time becomes a portion of the product stream. In other words, by judicious selection of heat retentive particles, impurities are removed from a process without the addition of a processing step such as the sulfur removing steps hereinbefore discussed.

As hereinbefore stated, in order to be successful in effecting the process of this invention, the heat retentive particles must be selected to have certain qualities. All of the heat retentive particles need not have these qualities but a mixture of different kinds of particles must contain enough particles with these qualities so that sufficient quantities are present to effect the desired desulfurization. Therefore, the particle stream may be a mixture of particles having desulfurization qualities and inert particles not having desulfurization qualities. The particles having the aforesaid desulfurization qualities must be made of material which will form a stable sulfide at the conditions in the preconditioning zone but which will oxidize at the conditions in the heating zone and which, furthermore, are reducible by hydrogen or hydrocarbons. Although these limitations seem severe, there are many materials which may be used including but not limited to particles of iron, nickel, cobalt, molybdenum, chromium, vanadium, manganese, mixtures of these such as cobalt and molybdenum or numerous alloys of any of these or other materials known as the readily-reducible metals. The particles may consist of refractory oxides such as silica, alumina, magnesia, clay, zirconia, alundum, etc. upon which the aforesaid sulfide-forming materials are deposited. The particles should be either inert with respect to the primary reaction carried on in the catalyst bed or at least not harmful. Therefore, iron particles which are suitable particles for this use may have a mild catalytic effect to promote the reaction being effected in the reaction zone, however, it is still useful as a so-called inert particle. Other heat retentive particles that may be used in admixture with those having the above described qualities are such materials as sand, limestone, silica, alumina, magnesia, zirconia, clays of various kinds, etc. The most important quality of these inert particles is that they do not exert a harmful influence on the reaction, are hard, attrition resistant and resistant to thermal shocks.

The process of this invention is useful for any reaction where heat is consumed. Endothermic reactions effected in fixed catalyst beds are characterized by temperature drops through the catalyst beds which are caused by the heat of reaction being supplied by the sensible heat of the charge. It is clear that in processes such as this, the entire reaction may not be effected at optimum temperature since the temperature changes severely during the course of the reaction. Therefore, the charge must be introduced at hotter than optimum temperature or the effluent must be removed at colder than optimum temperature. The process of this invention, by supplying hot heat retentive particles as a flowing stream circulating homogeneously through the catalyst bed provides the necessary heat of reaction in situ where the reaction is being effected and avoids the aforementioned difficulty.

Besides supplying direct and homogeneous heat to the reaction zone, the method of this invention is capable of supplying heat at higher temperature than by conventional methods. Since the limitation on temperature in processing is usually in the structural strength of the metals from which the lines and vessels are made, it requires expensive alloys to effect processing at temperatures substantially above 1500° F. The method of this invention employs heat introduced directly into the flowing particle stream which may be separated from the containing metal walls by insulation. Therefore, the hottest point in the process is not in the structural metal but within the hot particle beds. The method of this invention may produce temperatures in excess of 2000° F. wherein no structural metal part is hotter than 200° F.

The process of this invention may be used for many reactions including cracking, hydrocracking, hydrogen manufacturing by the water gas method, dehydrogenation of naphthenes to produce aromatics, dehydrogenation of aliphatics to produce olefins, acetylenes or diolefins, hydrocracking and others.

The accompanying drawing is presented to more clearly describe the process of the present invention and is intended as an illustration rather than a limitation on the broad scope of the process.

In the drawing, sulfur contaminated charge is introduced through line 1 into a lower intermediate portion of preconditioning zone 2 wherein solid, heat retentive particles 3 are maintained as a descending stream which may be fluidized or at least in some state of hindered settling. For purposes of illustration, the process to be described is a process wherein hydrogen is manufactured by the reaction of hydrocarbon with steam to produce hydrogen and carbon oxides. The charge may consist of any hydrocarbon fraction and for purposes of illustrating the utility of this process, the charge will consist of a heavy residual hydrocarbon fraction such as the vacuum bottoms fraction of a petroleum crude, which fraction boils above 980° F. The charge, upon contacting the hot particles which are maintained in the preconditioning zone 2 at a temperature of from about 1100° F. to about 1500° F., is vaporized and thermally decomposed to form a carbonaceous deposit, a sulfide of the heat retentive particles and a vapor phase consisting of sulfur-free hydrocarbons boiling up to about 1150° F. which passes upwardly, combined with steam, into the reaction zone 4 which is openly communicating with preconditioning zone 2. Steam may be introduced with the charge or as a separate stream.

In reaction zone 4, the steam and hydrocarbon react in the presence of catalyst particles 5 to produce large quantities of hydrogen and carbon oxides. The temperature in reaction zone 2 is maintained at from about 1500° F. to about 1850° F., at which temperature the reaction proceeds at a rapid rate and equilibrium is favorable for the formation of hydrogen. The reaction products pass upwardly from the catalyst bed into an open space in the upper portion of reaction zone 4 and discharge through particle separator 6 into product withdrawal line 7. The hot particles circulating through reaction zone 4 maintain the fixed or fixed-fluidized catalyst bed 5 at reaction temperatures in spite of the fact that the reaction effected therein is highly endothermic and requires high temperature.

Many catalysts are suitable for use in reaction zone 4 and these include the so-called heavy metal catalysts such as platinum, palladium, iron, cobalt, nickel, manganese, chromium, molybdenum, tungsten, vanadium, etc. or mixtures of these and preferably small quantities of these metal catalysts disposed on refractory oxide carrier materials such as silica, alumina, zirconia, etc. or combinations of these. The catalyst particles, as heretofore stated, must be large enough so that the smaller inert particles can percolate through the voids between the catalyst particles. The catalyst particles may be spheres up to ½" in diameter or may have such shapes as saddles, cylinders, hollow cylinders, rings, pellets, etc. The catalyst particles may be arranged in a specific manner to provide regular channels for the heat retentive particles to flow through or they may be placed randomly.

As a result of the thermal decomposition reactions effected in the preconditioning zone, the sulfided particles passing from the preconditioning zone through line 8 contain thereon a heavy deposit of carbonaceous solid, semi-solid or liquid material known as coke. A stripping gas such as steam may be introduced into conduit 8 through line 9 to remove vaporizable hydrocarbons from the particle stream and the remaining material passes downwardly into conduit 10 which contains a flowing stream of lifting gas. The lifting gas may be steam, air, inert gas, fuel gas, vaporized hydrocarbon, etc., and its function is to transport the sulfided and coked particles to heating zone 11 which is at a higher elevation than reaction zone 4. In heating zone 11, the coke is burned from the particles and the particles are converted to the oxide form, both of these reactions place the particles in reusable form and result in an increased temperature of the particles so that they are heated to temperatures in the range of 2000° F. and, therefore, suitable for maintaining the reaction zone at its desired temperature. When additional heat is required, fuel may be introduced into the heating zone along with the oxidizing gas which is introduced through line 12. This fuel may be virtually any combustible material such as heavy oil, gas, light distillates, coke, etc. Gases are removed from the heating zone 11 through particle separator 13 and conduit 14.

The hot, oxidized particles from heating zone 11 pass downwardly through line 15 and re-enter reaction zone 4 to repeat the cycle. A stripping gas may be introduced to line 15 from line 16. In reaction zone 4 the particles are contacted with sulfur-free reducing gas, i.e., the hydrogen produced in the process, and this contact reduces the particles to the metallic form so that they are in condition to be sulfided again when they descend through the reaction zone to the preconditioning zone. A portion of the particles from zone 11 may by-pass reactor 4 and be discharged directly through line 17 into preconditioning zone 2.

There may be many variations of the process as herein described within the broad scope of this invention. For example, the zones required in the process may be arranged differently than pictured herein. The heating zone may be disposed below the preconditioning zone or beside it and any ordinary particle transfer means may be employed to convey particles from one zone to another. There also may be other by-passes in the flow of the product or the particles than those shown. For example, the product may be passed through the cooled particles discharging from the preconditioning zone to quench the product when such a quench is desirable.

Although the process was described with relation to the production of water-gas from hydrocarbons and water, it has many other uses. An example of such a use is in the reforming of a gasoline fraction. When a straight-run gasoline boiling between 135° F. and 400° F. and having an octane number in the range of 40 and a sulfur content of 0.3% by weight is passed into a preconditioning zone wherein a mixture of 70% sand and 30% particles of iron maintained at a temperature of 900° F. are descending, this charge is vaporized and passed upwardly from the preconditioning zone. During the preconditioning treatment, the charge is vaporized, heated to reaction temperature of 900° F. and desulfurized by reacting with the iron particles to form iron sulfide whereby the sulfur is removed from the charge. The purified charge passes upwardly from the preconditioning zone and enters a contiguous reaction zone wherein there is maintained a fixed bed of catalyst consisting of platinum disposed on hollow cylinders, ½" in diameter, of alumina which contains 0.8% by weight of fluoride. The platinum content of the catalyst is 0.3% by weight. This catalyst has high activity for promoting the hereinafter described reforming reactions, however, it is sulfur sensitive, that is, its ability to catalyze reactions is impaired by the presence of sulfur.

The contact of hydrocarbon and catalyst in the reaction zone is effected at a temperature of between 900° F. and 920° F. and results in a series of reactions known as reforming which include dehydrogenation of naphthenic hydrocarbons, cyclization of paraffinic hydrocarbons, isomerization of paraffinic hydrocarbons and hydrocracking of larger aliphatic hydrocarbon molecules, all of these reactions benefiting the gasoline to produce an ultimate product having an octane number of over 85. Since the platinum catalyst is sensitive to sulfur, the previous removal of sulfur from the charge in the preconditioning zone permits the catalyst to function at a higher activity level for a prolonged period of time and at a higher severity that it could be used without sulfur removal. Furthermore, the sulfur removal from the charge produces a sulfur-free product which is highly desirable compared with a sulfur-containing gasoline, the latter burning to produce corrosive combustion products and exerting an octane rating suppressing effect. Another advantage is that the hydrogen formed by dehydrogenation reactions in the reaction zone is not contaminated with hydrogen sulfide and may be recycled to the process without treatment or used alone without causing contamination by sulfur.

The process herein described is effected in the presence of hydrogen as a circulating stream, which hydrogen is combined with the charge or added directly to the reaction zone. The reaction is effected at elevated pressures, in this particular case at a pressure of 700 p.s.i.

The hereinbefore described reforming reactions have a net endothermic result which tends to lower the temperature of the material as it passes through the catalyst bed. The presence of a continuously downwardly flowing stream of hot inert particles, however, overcomes this effect so that the net result is that the temperature of the charge actually slightly increases as it passes through the reaction zone thereby maintaining the charge temperature at optimum. This is extremely important in reforming since the dehydrogenation reactions occur very rapidly and, therefore, lower the temperature of the charge before the slower hydrocracking and isomerization reactions can occur. By the method of this invention, the hottest portion of the catalyst bed is that which is last contacted by the charge so that the slower, more difficult to effect reactions may occur in the presence of a catalytic substance at high temperature.

The heat-carrying particles discharging from the preconditioning zone are entrained in a stream of natural gas and lifted to the oxidizing zone wherein the natural gas is commingled with oxygen and burned as fuel for the purpose of raising the temperature of the heat-carrying particles. During the oxidation, the iron sulfide contained in the heat-carrying particles is converted to iron oxide and $SO_2$ is released and vented to the atmosphere. The heated and oxidized particles are then passed into the top of the reaction zone as the aforementioned hot particles maintained at a temperature of around 950° F. and introduced into the reaction zone to maintain reaction temperature therein. The excess hydrogen from this process may be usefully employed by introducing it into the conduit through which hot particles pass from the burning zone to the reaction zone. The hydrogen will remove entrained oxygen by converting it to $H_2O$ and will at least initiate the iron oxide reduction before the hot particles get to the reaction zone. As a result of this process, a low octane sulfur contaminated gasoline fraction is converted into a high octane sulfur-free gasoline fraction and no additional desulfurizing step, such as a hydrofining desulfurizing process, is required.

As another example of the utility of this process, a feed stock consisting of heavy oil boiling above 900° F. such as vacuum bottoms or pitch may be thermally cracked and converted to water-gas, thereby producing useful fuel and/or hydrogen from a difficult to dispose of product. A vacuum bottoms fraction is introduced into the preconditioning zone and therein contacted with a stream of heat-carrying particles consisting of sand and iron at a temperature of 1500° F. At these temperature conditions, thermal reactions are effected changing the vacuum bottoms charge into vapor phase lower boiling constituents and solid coke which deposits on the heat-carrying particles. The iron portion of the heat-carrying particle stream is converted to the sulfide form, thereby removing combined sulfur from the feed and producing a stream of sulfided, coked heat-carrying particles which discharges from the lower portion of the preconditioning zone.

The particles discharging from the preconditioning zone are entrained in a stream of air and conveyed to a burning zone wherein the coke deposited on the particles is removed by combustion and the iron sulfide is converted to iron oxide. A portion of the hot particles are then passed from the heating zone to the reaction zone in sufficient quantity, at the temperature at which they exist, to maintain the reaction zone at a temperature of 1800° F. In the reaction zone the reaction between steam and vaporous product from the preconditioning zone is effected in the presence of a catalyst consisting of 12% by weight of nickel deposited on ½" spheres of silica to form hydrogen and carbon monoxide. In the reaction zone, the iron oxide particles are reduced to iron and they pass from the reaction zone to the preconditioning zone at a temperature of about 1500° F. and in a reduced state. A second portion of the particles from the heating zone are passed directly to the preconditioning zone at temperatures of about 2100° F. and these latter particles are in sufficient quantity to provide the heat for raising the temperature of the charge and vaporizing and cracking it in the preconditioning zone. By the process of this invention, a sulfur-containing vacuum bottoms fraction is converted to a useful fuel gas and a source of hydrogen. The process is effected without contaminating the catalyst employed in the reaction zone since only sulfur-free material which has had precipitatable material removed therefrom is in contact with the catalyst. The sulfur and coke-forming materials in the charge are removed to a heating zone where they are usefully employed to obtain heat for use in the reaction zone.

I claim as my invention:

1. A process for effecting catalyzed reactions employing a sulfur-contaminated hydrocarbon charge which comprises passing said charge into the lower portion of a preconditioning zone wherein it is contacted with and desulfurized by particles of solid, heat retentive, readily reducible, sulfide-forming material, passing the desulfurized charge in vapor phase upwardly from said zone into an openly communicating reaction zone containing a bed of catalyst particles which are of larger size than said heat retentive particles, removing the resultant product from said reaction zone, passing sulfided heat retentive particles from the lower portion of said preconditioning zone into a heating zone and contacting said sulfided particles therein with an oxidizing gas, passing oxidized and heated particles from said heating zone into said reaction zone at a point above said catalyst particles in sufficient quantity and at sufficient temperature to maintain said reaction zone at the desired reaction temperature, and passing said heated and oxidized particles downwardly through said bed of catalyst particles and into said preconditioning zone.

2. A process for effecting catalyzed reactions with a sulfur-contaminated hydrocarbon charge which comprises passing said charge into the lower portion of a preconditioning zone wherein it is contacted with and desulfurized by particles of solid, heat retentive, readily reducible, sulfide-forming material, passing the desulfurized charge in vapor phase upwardly from said zone into an openly communicating reaction zone containing a bed of catalyst particles which are of larger size than said heat retentive particles, removing the resultant product from said reaction zone, passing sulfided heat retentive particles from the lower portion of said preconditioning zone into a heating zone and contacting said sulfided particles therein with an oxidizing gas, passing a portion of the heated and oxidized particles from said heating zone into said reaction zone in sufficient quantity and at a sufficient temperature to maintain said reaction zone at the desired reaction temperature, passing said portion of the heated and oxidized particles downwardly through said catalyst bed and into the upper portion of said preconditioning zone and passing a second portion of said heated and oxidized particles from said heating zone directly into the upper portion of said preconditioning zone.

3. The process of claim 1 further characterized in that said heat retentive particles comprise iron.

4. The process of claim 1 further characterized in that said heat retentive particles comprise cobalt.

5. The process of claim 1 further characterized in that said heat retentive particles comprise molybdenum.

6. The process of claim 1 further characterized in that said heat retentive particles comprise cobalt and molybdenum.

7. A process for effecting catalyzed reactions employing a sulfur-contaminated hydrocarbon charge which comprises passing said charge into the lower portion of a preconditioning zone wherein it is contacted with and desulfurized by a particulated mixture of a solid, inert, heat retentive material and a readily reducible, sulfide-forming constituent, passing the desulfurized charge in vapor phase upwardly from said zone into an openly communicating reaction zone containing a bed of catalyst particles which are of larger size than the particles of said mixture, removing the resultant product from said reaction zone, passing admixed heat retentive particles and sulfided particles from the lower portion of said preconditioning zone into a heating zone and contacting the mixed particles therein with an oxidizing gas, passing oxidized and heated particles from said heating zone into said reaction zone at a point above said catalyst particles in sufficient quantity and at sufficient temperature to maintain said reaction zone at the desired reaction temperature, and passing said heated and oxidized particles downwardly through said bed of catalyst particles and into said preconditioning zone.

References Cited in the file of this patent

UNITED STATES PATENTS

| | | |
|---|---|---|
| 2,551,905 | Robinson | May 8, 1951 |
| 2,555,210 | Waddill et al. | May 29, 1951 |
| 2,631,921 | Odell | Mar. 17, 1953 |
| 2,662,003 | Waddill et al. | Dec. 8, 1953 |